US012680880B2

(12) United States Patent
Chu et al.

(10) Patent No.: US 12,680,880 B2
(45) Date of Patent: Jul. 14, 2026

(54) THERMOMETER STRUCTURE WITH HIGH STABILITY AND SYSTEM USING THE SAME

(71) Applicant: PIXART IMAGING INC., Hsin-Chu County (TW)

(72) Inventors: Yen-Chang Chu, Hsin-Chu County (TW); Po-Wei Yu, Hsin-Chu County (TW); Yen-Po Chen, Hsin-Chu County (TW); Chih-Ming Sun, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 1112 days.

(21) Appl. No.: 17/732,530

(22) Filed: Apr. 29, 2022

(65) Prior Publication Data

US 2023/0032079 A1    Feb. 2, 2023

(30) Foreign Application Priority Data

Jul. 29, 2021    (TW) ................................. 110127918

(51) Int. Cl.
*G01J 5/10*        (2006.01)
*G01J 5/0875*      (2022.01)

(52) U.S. Cl.
CPC ............... *G01J 5/10* (2013.01); *G01J 5/0875* (2013.01)

(58) Field of Classification Search
CPC .... G01J 5/10; G01J 5/0875; G01J 5/70; G01J 5/064; G01J 5/0037
See application file for complete search history.

(56) References Cited

U.S. PATENT DOCUMENTS

| | | | | |
|---|---|---|---|---|
| 5,227,631 A | * | 7/1993 | Hunter, III | G01J 5/34 250/352 |
| 5,874,736 A | * | 2/1999 | Pompei | G01J 5/05 250/339.11 |
| 6,435,711 B1 | * | 8/2002 | Gerlitz | G01J 5/028 374/E13.003 |

FOREIGN PATENT DOCUMENTS

| | | |
|---|---|---|
| CN | 102656430 A | 9/2012 |
| EP | 0568182 A1 | 11/1993 |
| JP | H10135383 A | 5/1998 |
| WO | 2016152220 A1 | 9/2016 |

* cited by examiner

*Primary Examiner* — John E Breene
*Assistant Examiner* — Janice M Soto
(74) *Attorney, Agent, or Firm* — HAUPTMAN HAM, LLP

(57) ABSTRACT

There is provided a thermometer structure including a circuit board, an infrared thermometer, a heat sink and a metal block. The infrared thermometer is arranged on the circuit board and electrically connected thereto. The heat sink is arranged on the circuit board and covers the infrared thermometer. The metal block is in contact with at least one of the circuit board and the heat sink to stabilize a local temperature of the thermometer structure.

13 Claims, 5 Drawing Sheets

THERMOMETER STRUCTURE WITH HIGH STABILITY AND SYSTEM USING THE SAME

CROSS REFERENCE TO RELATED APPLICATION

This application claims the priority benefit of Taiwan Patent Application Serial Number 110127918, filed on Jul. 29, 2021, and the full disclosure of which is incorporated herein by reference.

BACKGROUND

1. Field of the Disclosure

This disclosure generally relates to a thermometer structure and, more particularly, to a thermometer structure that stabilizes a local temperature thereof using a metal block, wherein the metal block is not provided with electricity and has a volume preferably larger than that of an infrared thermometer thereof

2. Description of the Related Art

Generally, in measuring a temperature of an object to be measured using an infrared thermometer, a local temperature (generally called Ta) inside the thermometer is used as a reference value to estimate an object temperature (generally called To). However, in some applications, when the object temperature is higher, the object is closer to the infrared thermometer, an object mass is larger or an external ambient temperature has a significant variation, the local temperature inside the infrared thermometer is influenced thereby to have a deviation. Accordingly, the object temperature fluctuates due to the unstable reference value to degrade the measurement accuracy.

Accordingly, the present disclosure further provides an infrared thermometer structure that adopts a metal block to stabilize an inner local temperature thereby improving the measurement accuracy.

SUMMARY

One objective of the present disclosure is to provide a thermometer structure that is arranged with an additional metal block inside a heat shield to stabilize a local temperature inside the thermometer, wherein the metal block is in contact with a circuit hoard.

Another objective of the present disclosure is to provide a thermometer structure that is arranged with an additional heat conducting metal route inside a heat shield, wherein the heat conducting metal route is in contact with a circuit board or a heat sink, and in contact with a metal block outside the heat shield.

To achieve the above objective, the present disclosure provides a thermometer structure including a circuit board, an infrared thermometer, a metal block and a heat shield. The infrared thermometer is arranged on a first surface of the circuit board. The metal block is arranged on a second surface of the circuit board, wherein a volume of the metal block is larger than that of the infrared thermometer. The heat shield covers the circuit board, the infrared thermometer and the metal block, and has a first window opposite to the infrared thermometer.

Besides, the present disclosure further provides a thermometer structure including a circuit board, an infrared thermometer, a heat sink, a heat shield and a heat conductive path. The infrared thermometer is arranged on a first surface of the circuit board. The heat sink is arranged on the first surface of the circuit board and covering the infrared thermometer. The heat shield covers the circuit board, the infrared thermometer and the heat sink, and has a first window opposite to the infrared thermometer. The heat conductive path is in contact with at least one of the heat sink and the circuit board, and extends from inside of the heat shield to outside of the heat shield to form a heat contact point.

Besides, the present disclosure further provides a system capable of measuring an object temperature, including a heat shield, a thermometer structure and a metal block. The heat shield is attached to the system and has a first window. The thermometer structure is arranged inside the heat shield, and includes a circuit board, a thermopile sensor and a heat sink. The thermopile sensor is arranged on a first surface of the circuit board and opposite to the first window. The heat sink is arranged on the first surface of the circuit board and covers the thermopile sensor, and has a second window opposite to the first window of the heat shield. The metal block connects to at least one of the circuit board and the heat sink.

The infrared thermometer structure of the present disclosure is specifically adaptable to measure an object having a high temperature and a large mass since the object to be measured can change the surrounding ambient temperature.

BRIEF DESCRIPTION OF THE DRAWING

Other objects, advantages, and novel features of the present disclosure will become more apparent front the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The thermometer structure of the present disclosure reduces a scale of temperature variation of a reference temperature of an infrared thermometer with external temperatures to accordingly improve the measurement accuracy.

Figure 1:
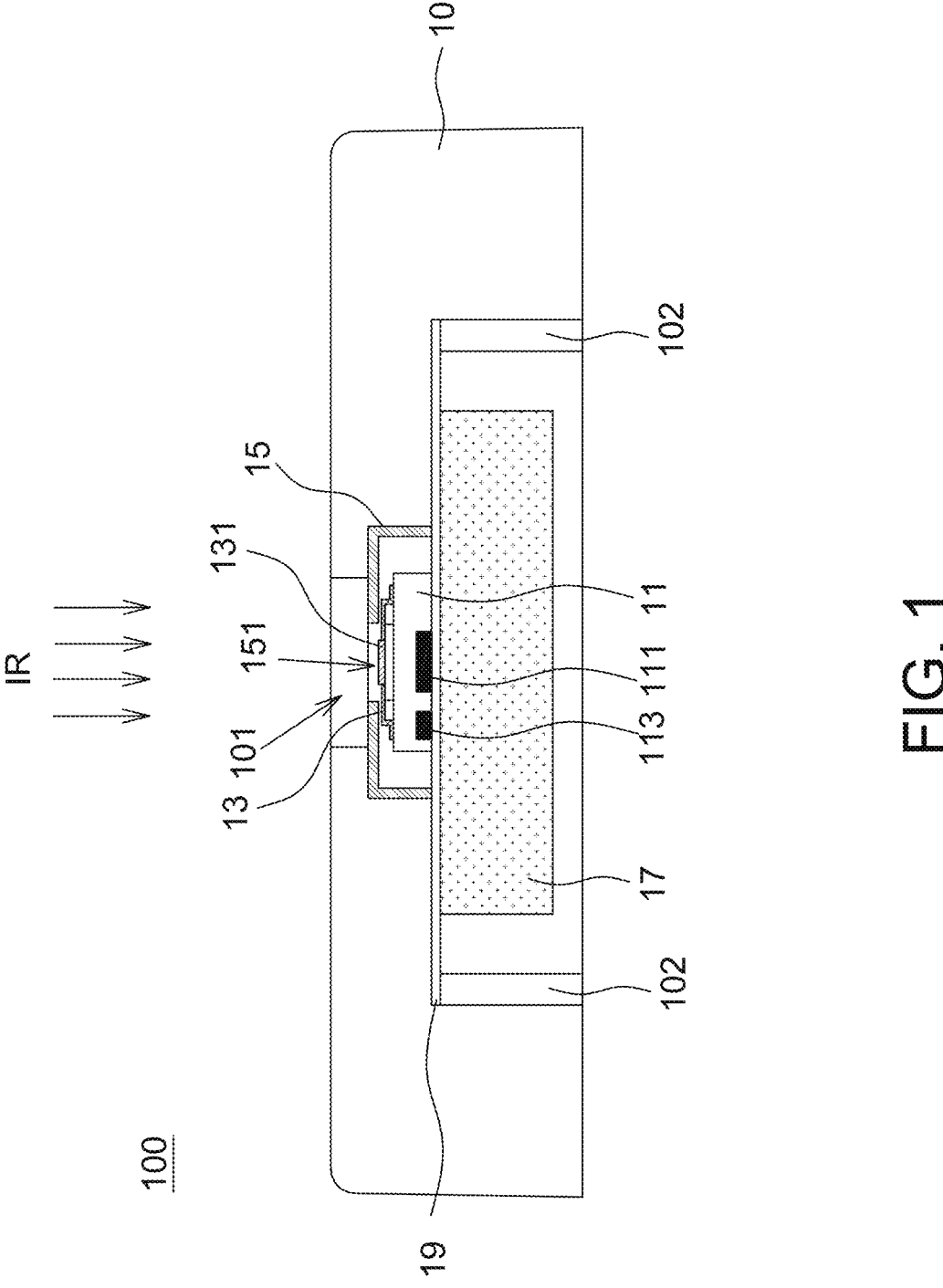
FIG. 1 is a schematic diagram of a thermometer structure according to a first embodiment of the present disclosure.

Please refer to FIG. 1, it is a schematic diagram of a thermometer structure 100 according to a first embodiment of the present disclosure. The thermometer structure 100 includes a circuit board 19, an infrared thermometer 11, a lens holder 13, a lens 131, a heat sink 15, a metal block 17 and a heat shield 10, Wherein the heat shield 10 has a first window 101, and covers the circuit board 19, the infrared thermometer 11, the lens holder 13, the lens 131, the heal sink 15 and the metal block 17 for limiting the infrared thermometer 11 to receive heat energy only through the first window 101. The heat shield 10 is made of, for example, plastic of rubber, but not limited to.

The circuit board 19 is, for example, a printed circuit board (PCB) or a flexible board (FB).

The infrared thermometer 11 is arranged on a first surface (e.g., upper surface in FIG. 1) of the circuit board 11, and opposite to the first window 101 for receiving infrared light IR via the first window 101. The infrared thermometer 11 includes a thermopile sensor 111 and a local sensor 113 arranged on the circuit board 19 and electrically connected thereto. The thermopile sensor 111. is opposite to the first window 101 of the heat shield 10, and receives external infrared light IR via the first window 101 to detect a temperature value.

The local sensor 113 is used to detect a reference temperature of the thermometer structure 100 as a reference for estimating the temperature value detected by the thermopile sensor 111. The method of estimating the temperature value detected by the thermopile sensor 111 based on the reference temperature detected by the local sensor 113 is known to the art, and thus is not described herein. The local sensor 113 is selected from at least one of, for example, a resistance temperature detector (RTD), CMOS integrated. temperature sensor, thermistor, an integrated bandgap voltage reference and a thin film resistor, but not limited to.

The lens holder 13 is arranged on a sensing surface of the infrared thermometer 11 for carrying the lens 131. The lens 131 is opposite to the first window 101 of the heat shield 10 for improving sensing efficiency of the infrared thermometer 11 and avoiding dust to enter the infrared thermometer 11. The lens 131 is a convex lens or a plane lens for blocking non-infrared electromagnetic waves. For example, if the thermometer structure of the present disclosure is adapted to a system requiring a temperature distribution, the lens 131 uses a convex lens; whereas if the thermometer structure of the present disclosure is adapted to a system requiring a single temperature value (e.g., forehead thermometer or coffee machine), the lens 131 is a plane lens.

Although FIG. 1 shows that the lens holder 13 is arranged on a surface of the infrared thermometer 11 (e.g., the chip surface), the present disclosure is not limited thereto. In another aspect, the lens holder 13 is arranged on the circuit board 19.

The heat sink 15 is arranged on the first surface of the circuit board II, covers the infrared thermometer 11, and disposed between the infrared thermometer 11 and the heat shield 10. The heat sink 15 has a second window 151 opposite to the firs window 101 of the heat shield 10.

In the present disclosure, to prevent a total temperature of the thermometer structure 100 from fluctuating with external temperatures, an additional metal block 17 is arranged on a second surface (e.g., lower surface in FIG. 1) of the circuit board 19 and encapsulated in the heat shield 10, wherein a volume of the metal block 17 is preferable larger than a volume of the infrared thermometer 11. For example, a contact area of the metal block 17 with the second surface of the circuit bard 19 is larger than a cross section of the infrared thermometer 11 and smaller than an area of the circuit board 19. The contact area is, for example, a rectangle, a circular shape, a trapezoidal shape, a triangle or other shapes without particular limitations.

Accordingly, because the total metal mass of the thermometer structure 100 is increased, a total temperature of the thermometer structure 100 is difficult to change with external temperatures.

In addition, because the circuit board 19 and the infrared thermometer 11 are both covered by the heat shield 10, the heat shield 10 preferably has an electric conductive path (e.g., 102) for electrically connecting to the circuit board 19 and external components, e.g., micro controller and/or external power (not shown) so as to transmit signals to and receive signals from the circuit board 19 and/or to provide power to the circuit board 19 therethrough. In some aspects, the micro controller is arranged on the circuit board 19.

Furthermore, the heat shield 10 preferably has the structure (e.g., screw hole or latch) for being secured by a securing member so as to fix the thermometer structure 100 at a predetermined position or on a device. In one aspect, the thermometer structure 100 sends detected signals via wireless signals.

In another aspect, the metal block 17 is arranged at a first surface of the circuit board 19, e.g., adjacent to the heat sink 15. In an alternative aspect, the metal block 17 is arranged at both the first surface and the second surface of the circuit board 19. Although FIG. 1 shows that the metal block 17 is opposite to the infrared thermometer 11, but the present disclosure is not limited thereto. In another aspect, the metal block 17 is not opposite to the infrared thermometer 11 but is still encapsulated inside the heat shield 10.

Figure 2:
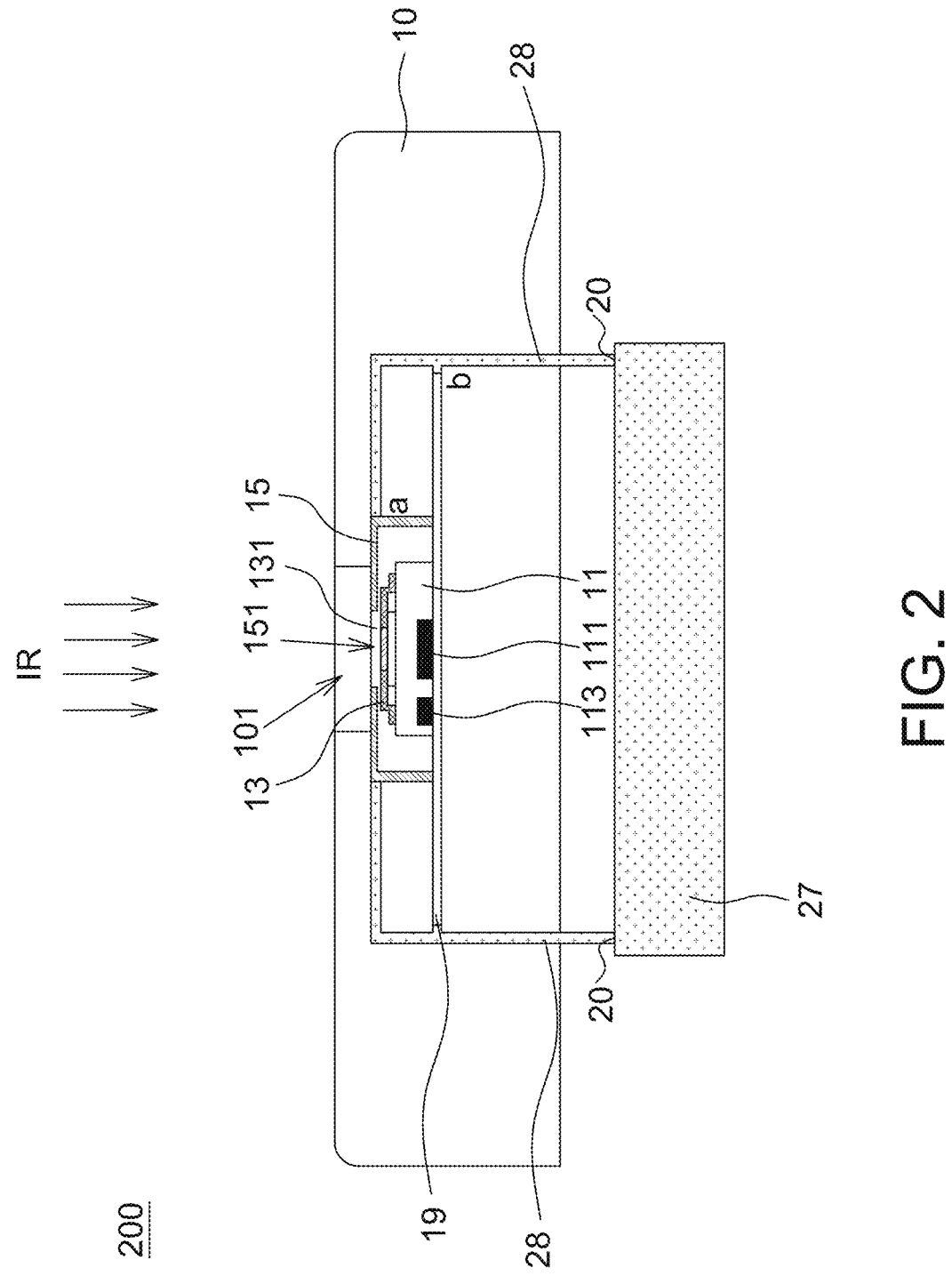
FIG. 2 is a schematic diagram of a thermometer structure according to a second embodiment of the present disclosure.

Please refer to FIG. 2, it is a schematic diagram of a thermometer structure 200 according to a second embodiment of the present disclosure. Components in FIG. 2 identical to those in FIG. 1 are indicated by identical reference numerals.

The thermometer structure 200 also includes a circuit board 19, an infrared thermometer 11, a lens holder 13, a lens 131, a heat sink 15 and a heat shield 10, wherein the arrangement of these components is identical to that in FIG. 1 and thus details thereof are not repeated herein.

The difference between the second embodiment and the first embodiment is that in the thermometer structure 200, no metal block is arranged inside the heat shield 10, and a heat conductive path 28 is arranged to be in contact with at least one of the heat sink 15 (e.g., shown via contact point a) and the circuit board 19 (e.g., shown via contact b). The heat conductive path 28 extends from inside of the heat shield 10 to outside of the heat shield 10 to form a heat contact point 20 (e.g., two heat contact points 20 being shown in FIG. 2, but the number is not limited to 2).

In other words, the heat shield 10 covers the circuit board 19, the infrared thermometer 11, the lens holder 13, the lens 131, the heat sink 15, and the heat conductive path 28. The heat conductive path 28 is, for example, at least one metal sheet or at least one metal wire for contacting a metal block 27 external to the heat shield 10 via the heat contact point 20. The volume of the metal block 27 is not particularly limited but preferably is larger than a volume of the infrared thermometer 11. In this way, it is also able to achieve the effect of stabilizing a total temperature of the thermometer structure 200.

When the heat conductive path 28 is in contact with the circuit board 19, the heat conductive path 28 is arranged to be in contact with at least one of a first surface, sides (e.g., left and right sides in FIG. 2) and a second surface, which is opposite to the first surface, of the circuit board 19. For example, the heat conductive path 28 has a metal plate attached to a part of surfaces of the circuit board 19 to increase heat conducting efficiency. The heat conductive path 28 forms a contact surface or multiple contact points with the heat sink 15 and the circuit board 19 to increase the contact area. In this embodiment, the heat conductive path 28 is used to conduct heat energy without transmitting any current or electric signal, and thus a cross section of the heat conductive path 28 is set as large as possible.

In addition, to further improve the heat conducting efficiency, in one aspect the area of the heat contact point 20 is selected to be larger than or equal to the cross section of the heat conductive path 28 inside the heat shield 10 so as to have a larger contact area with the metal block 27. In another aspect, the heat contact point 20 is arranged as a metal plate or multiple metal points at a bottom surface of the heat shield 10, but not limited thereto. A length of the heat conductive path 28 outside the heat shield 10 is not particularly limited.

Figure 6:
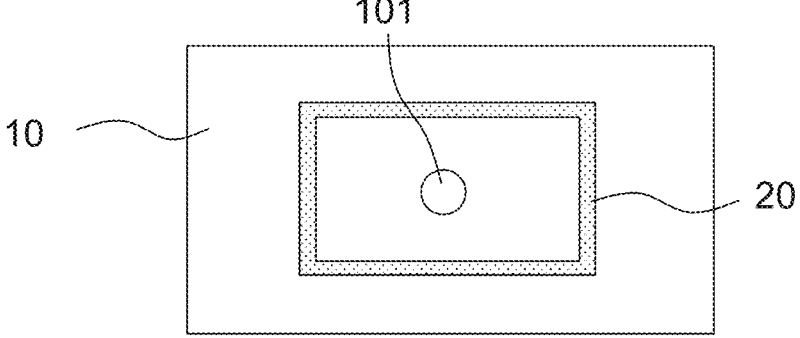
FIG. 6 is a bottom view of a thermometer structure according to the second embodiment of the present disclosure.

For example, the heat conductive path 28 is selected to be arranged at four sides of the infrared thermometer 11, as shown in FIG. 6 a looped heat contact point 20 being arranged at a bottom surface of the heat shield 10. The looped heat contact point 20 is not limited to be arranged as a continuous loop and a shape thereof is not limited to rectangle.

Similarly, the heat shield 10 is further arranged with a securing structure (not shown) and an electric conductive path (not shown) as mentioned above.

Figure 3:
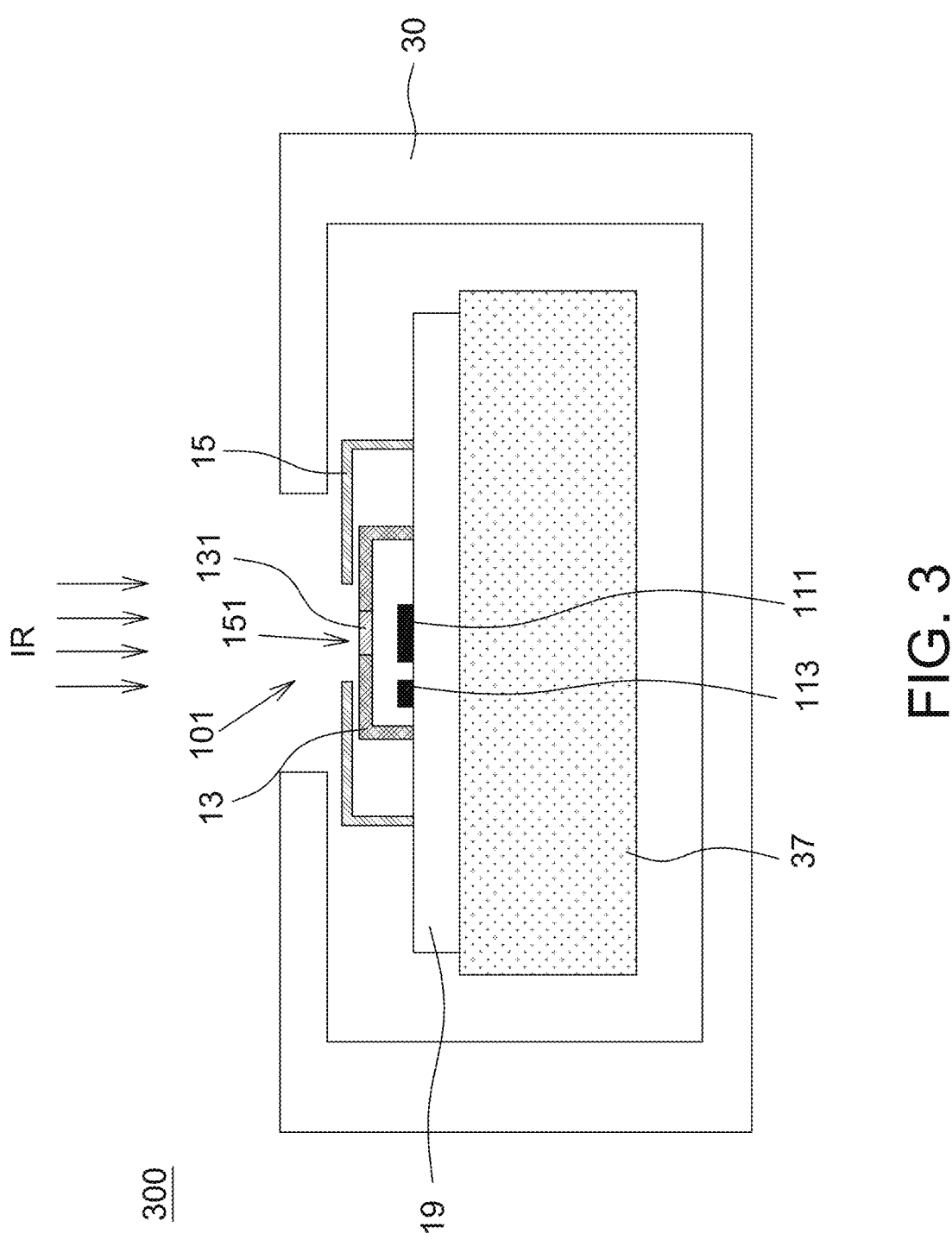
FIG. 3 is a schematic diagram of a thermometer structure according to a third embodiment of the present disclosure.

Please refer to FIG. 3, it is a schematic diagram of a thermometer structure 300 according to a third embodiment of the present disclosure. Components in FIG. 3 identical to those in FIG. 1 are indicated by identical reference numerals.

The thermometer structure 300 also includes a circuit board 19, an infrared thermometer (including a thermopile sensor 111 and a local sensor 113), a lens holder 13, a lens 131 and a heat sink 15, wherein these components are arranged identical to those in FIG I and have been illustrated above, and thus are not repeated herein.

Figure 5:
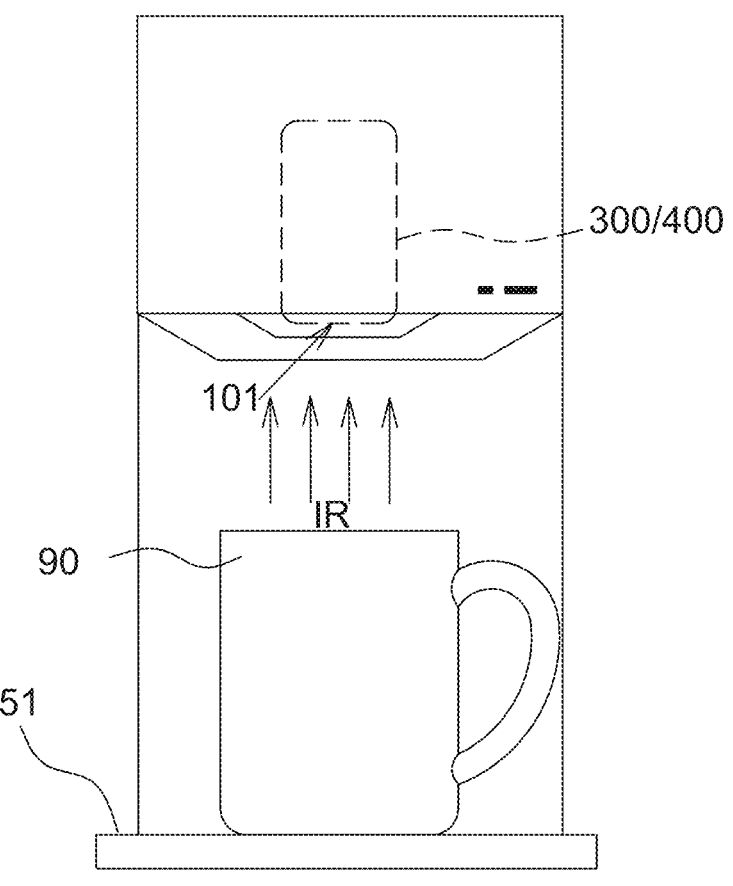
FIG. 5 is a schematic diagram of a system using the thermometer structure of the present disclosure.

The difference between the third embodiment and the first embodiment is that the heat shield 30 is one component, which is made of plastic or rubber, of a system capable of measuring an object temperature. For example referring to FIG. 5, if the system is an electric coffee machine, the heat shield 30 is arranged, for example, above an object to be measured (e.g., coffee pot) 90 and has a first window 101 opposite to the object to be measured 90 arranged on a carriage base 51. The heat shield 30 is fixed on and electrically connected to the system.

In the third embodiment, the circuit board 19, the infrared thermometer, the lens holder 13, the lens 131 and the heat sink 15 are arranged inside the heat shield 30. The thermometer structure 300 of this embodiment further includes a metal block 37 directly in contact with a second surface (e.g., lower surface in FIG. 3) of the circuit board 19, wherein a volume of the metal block 37 is preferably larger than a volume of the heat sink 15.

More specifically, the difference between the thermometer structure 300 and the thermometer structure 100 is that the heat shield 30 is a component or a structure belong to a system (e.g., the system having a space or connecting position exclusive for the heat shield 30), and other parts have no difference. Furthermore, in the third embodiment, a contact area of a contact surface between the metal block 37 and the circuit board 19 is selected to be larger than an area of the circuit board 19. The attachment between the metal block 37 and the circuit board 19 does not have particular limitations.

Similarly, the heat shield 30 further includes an electric conductive path to allow the infrared thermometer 11 to receive electricity or perform communication therethrough. In the third embodiment, the thermometer structure 300 is arranged to output detected signals in the wireless manner.

Figure 4:
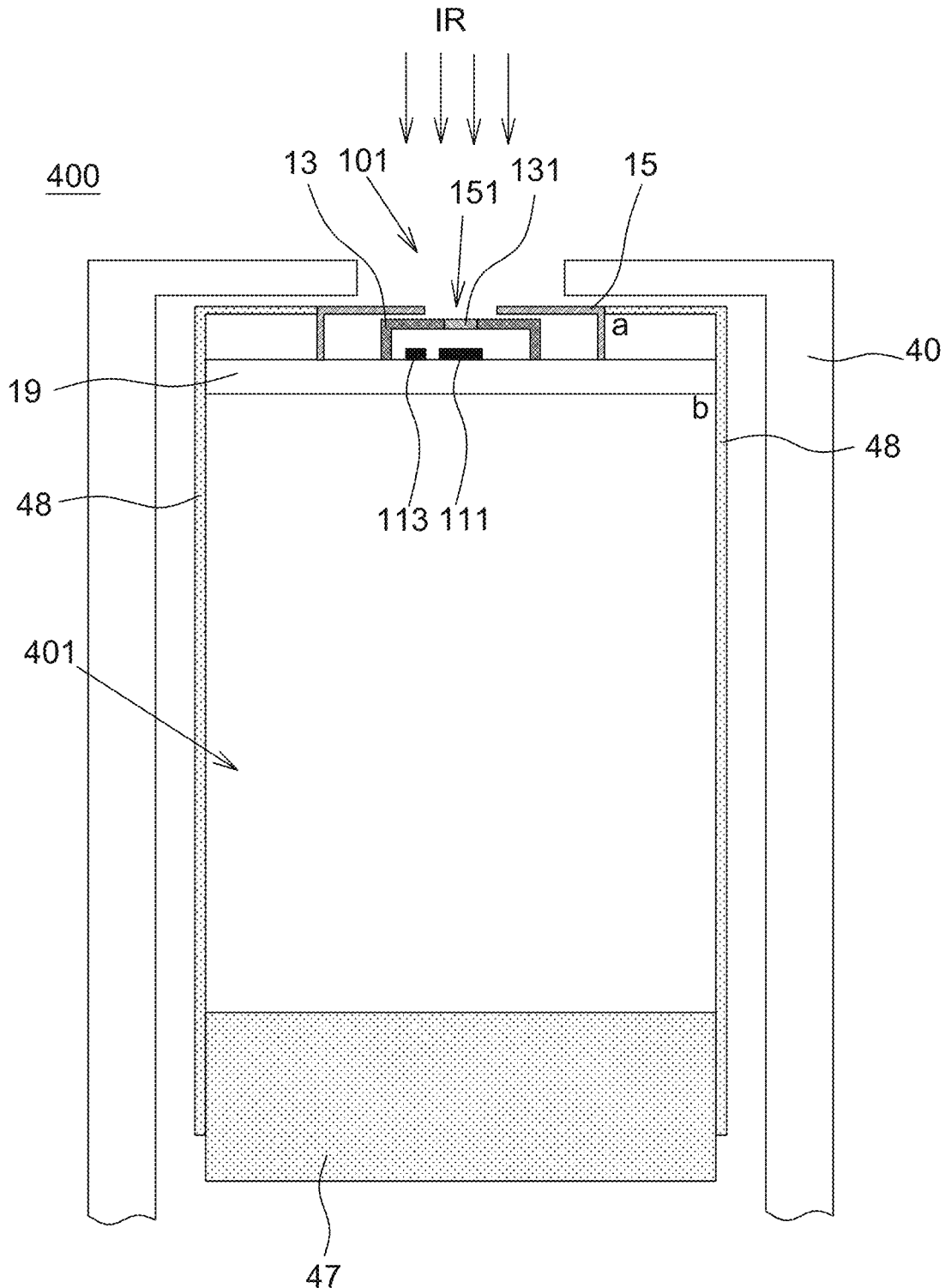
FIG. 4 is a schematic diagram of a thermometer structure according to a fourth embodiment of the present disclosure.

Please refer to FIG. 4, it is a schematic diagram of a thermometer structure 400 according to a fourth embodiment of the present disclosure. Components in FIG. 4 identical to those in FIG. 1 are indicated by identical reference numerals.

The thermometer structure 400 also includes a circuit board 19, an infrared thermometer (including a thermopile sensor 111 and a local sensor 113), a lens holder 13, a lens 131 and a heat sink 15, wherein these components are arranged identical to those in FIG. 1 and have been illustrated above, and thus are not repeated herein. The circuit board 19, the infrared thermometer, the lens holder 13, the lens 131 and the heat sink 15 are arranged inside the heat shield 40. The heat shield 40 is also one component of a system capable of measuring an object temperature.

The difference between the fourth embodiment and the third embodiment is that the metal block 47 is not directly attached to a second surface of the circuit board 19, but is connected to at least one of the circuit board 19 and the heat sink 15 via a heat conductive path 48 (e.g., at least one of a metal sheet or a metal wire), and the connection method is similar to that of the thermometer structure 200 of the second embodiment and thus details thereof are not repeated herein. The difference between the fourth embodiment and the second embodiment is that the heat shield 40 is a component or a structure belong to a system (e.g., having a space or connection position in the system exclusive for the heat shield 40), e.g., referring to FIG. 5.

Furthermore, in the fourth embodiment, the metal block 47 is arranged inside or outside the heat shield 40 without particular limitations.

For example, when the metal block 47 is arranged inside the heat shield 40, an inner space 401 between the circuit board 19 and the metal block 47 is used to arrange a power source or other system accessories.

For example, when the metal block 47 is arranged outside the heat shield 40, the metal block 47 is an additionally arranged metal or a metal structure of a system (e.g., arranged on the system before shipment). In this case, as described in the second embodiment, the heat conductive path 48 preferably forms a heat contact point outside the heat shield 40 to facilitate the contact with the metal block 47. As mentioned above, said heat contact point is arranged to have a larger area to increase a contact area with the metal block 47.

In the present disclosure, the volume of the metal blocks 17, 27, 37 and 47 is adjustable with the operating environment. For example, when an object to be measured has a larger volume and has a higher temperature, the larger metal blocks 17, 27, 37 and 47 are selected; on the contrary, when an object to be measured has a smaller volume and has a lower temperature, the smaller metal blocks 17, 27, 37 and 47 are selected.

It should be mentioned that although the present disclosure is illustrated by using a coffee machine as an example, the present disclosure is not limited thereto. The thermometer structures 300 and 400 are adaptable to other systems capable of measuring the temperature of a target object without particular limitations, e.g., adapted to a smart kitchen system for monitoring the pot temperature.

It should be mentioned that although the above embodiments are illustrated in the way that the local sensor 113 is located inside the heat sink 15, the present disclosure is limited thereto. In other aspects, the local sensor 113 is arranged outside the heat sink 15 and electrically connected to the circuit board 19.

In some aspects, thermometer structures of every embodiment of the present disclosure further include a filter for blocking light spectrum outside infrared light. Said filter is, for example, coated on a surface of the lens 131, arranged between the infrared thermometer 11 and the lens 131, or arranged inside the second window 151 without particular limitations.

It is appreciated that a number of components and a size ratio between components in drawings of every embodiment of the present disclosure are only intended to illustrate but not to limit the present disclosure.

As mentioned above, because an infrared thermometer generally has a small volume, a local temperature therein can be easily influenced by external ambient temperatures to degrade the measurement accuracy thereof. Accordingly, the present disclosure further provides a thermometer structure with an additional metal block or a heat conductive path (e.g., referring to FIGS. 1-4) to reduce the fluctuation of inner reference temperatures varied with external temperatures to stabilize the measured temperature, wherein the metal block is directly arranged inside a heat shield or arranged outside the heat shield connected by the heat conductive path. In this way, a total metal volume of the thermometer structure is increased such that it is difficult to have a temperature fluctuation with external temperatures.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A thermometer structure, comprising:
a circuit board;
an infrared thermometer, arranged on a first surface of the circuit board;
a heat sink, arranged on the first surface of the circuit board and covering the infrared thermometer;
a heat shield, covering the circuit board, the infrared thermometer and the heat sink, and having a first window opposite to the infrared thermometer; and
a heat conductive path, in contact with at least one of the heat sink and the circuit board, and extending from inside of the heat shield to outside of the heat shield to form a heat contact point.

2. The thermometer structure as claimed in claim 1, wherein when the heat conductive path is in contact with the circuit board, the heat conductive path is in contact with at least one of the first surface, a side surface and a second surface, opposite to the first surface, of the circuit board.

3. The thermometer structure as claimed in claim 1, wherein the heat sink has a second window opposite to the first window of the heat shield.

4. The thermometer structure as claimed in claim 1, wherein the heat conductive path is not configured to transmit any signal.

5. The thermometer structure as claimed in claim 1, wherein the heat shield further comprises an electric conductive path electrically connecting to the circuit board and an external component.

6. The thermometer structure as claimed in claim 1, further comprising a lens opposite to the first window of the heat shield.

7. The thermometer structure as claimed in claim 1, wherein the infrared thermometer comprises:
a thermopile sensor, opposite to the first window of the heat shield, and configured to receive external infrared light through the first window to detect a temperature value; and
a local sensor, configured to detect a reference temperature of the thermometer structure as a reference in estimating the temperature value detected by the thermopile sensor.

8. The thermometer structure as claimed in claim 1, wherein an area of the heat contact point is larger than a cross section of the heat conductive path inside the heat shield.

9. A system for measuring an object temperature, the system comprising:
a heat shield, attached to the system and has a first window; and
a thermometer structure, arranged inside the heat shield, and comprising:
a circuit board;
a thermopile sensor, arranged on a first surface of the circuit board and opposite to the first window; and
a heat sink, arranged on the first surface of the circuit board and covering the thermopile sensor, and having a second window opposite to the first window of the heat shield; and
a metal block, connecting to the circuit board and the heat sink via a heat conductive path, wherein the heat conductive path extends from a side surface, other than a surface facing the circuit board, of the metal block to be in contact with a side surface of the circuit board.

10. The system as claimed in claim 9, wherein the metal block is directly in contact with a second surface of the circuit board, and a volume of the metal block is larger than that of the heat sink.

11. The system as claimed in claim 9, wherein the metal block is arranged inside the heat shield.

12. The system as claimed in claim 9, wherein the metal block is arranged outside the heat shield.

13. The system as claimed in claim 9, wherein the metal block is an additionally arranged component or a metal structure of the system.

* * * * *